United States Patent
Goldsmith et al.

(10) Patent No.: US 10,889,872 B2
(45) Date of Patent: Jan. 12, 2021

(54) TOOL STEEL ARTICLES FROM ADDITIVE MANUFACTURING

(71) Applicant: Kennametal Inc., Latrobe, PA (US)

(72) Inventors: Jason W. Goldsmith, Greensburg, PA (US); Yingwei Wu, Latrobe, PA (US)

(73) Assignee: KENNAMETAL INC., Latrobe, PA (US)

( * ) Notice: Subject to any disclaimer, the term of this patent is extended or adjusted under 35 U.S.C. 154(b) by 414 days.

(21) Appl. No.: 15/667,390

(22) Filed: Aug. 2, 2017

(65) Prior Publication Data
US 2019/0040481 A1 Feb. 7, 2019

(51) Int. Cl.
| | | |
|---|---|---|
| C21D 6/00 | (2006.01) | |
| B33Y 10/00 | (2015.01) | |
| B33Y 40/00 | (2020.01) | |
| B33Y 70/00 | (2020.01) | |
| B33Y 80/00 | (2015.01) | |
| B22F 3/105 | (2006.01) | |
| B22F 3/15 | (2006.01) | |
| B22F 3/24 | (2006.01) | |
| C22C 38/52 | (2006.01) | |
| C22C 38/46 | (2006.01) | |
| C22C 38/44 | (2006.01) | |
| C22C 38/04 | (2006.01) | |
| C22C 38/02 | (2006.01) | |
| C21D 1/25 | (2006.01) | |
| B23K 26/342 | (2014.01) | |
| C22C 33/02 | (2006.01) | |
| B22F 3/00 | (2006.01) | |

(52) U.S. Cl.
CPC ............ *C21D 6/008* (2013.01); *B22F 3/008* (2013.01); *B22F 3/1055* (2013.01); *B22F 3/15* (2013.01); *B22F 3/24* (2013.01); *B23K 26/342* (2015.10); *B33Y 10/00* (2014.12); *B33Y 40/00* (2014.12); *B33Y 70/00* (2014.12); *B33Y 80/00* (2014.12); *C21D 1/25* (2013.01); *C21D 6/004* (2013.01); *C21D 6/005* (2013.01); *C21D 6/007* (2013.01); *C22C 33/0271* (2013.01); *C22C 33/0285* (2013.01); *C22C 38/02* (2013.01); *C22C 38/04* (2013.01); *C22C 38/44* (2013.01); *C22C 38/46* (2013.01); *C22C 38/52* (2013.01); *B22F 2003/248* (2013.01); *B22F 2301/35* (2013.01); *B22F 2998/10* (2013.01)

(58) Field of Classification Search
CPC ............................. B33Y 10/00; C21D 6/008
USPC .......................................................... 419/66
See application file for complete search history.

(56) References Cited

U.S. PATENT DOCUMENTS

| | | |
|---|---|---|
| 2003/0062145 A1 | 4/2003 | Frasier |
| 2014/0053956 A1 | 2/2014 | Etter |
| 2014/0099476 A1 | 4/2014 | Subramanian |
| 2014/0163717 A1 | 6/2014 | Das |
| 2015/0017475 A1 | 1/2015 | Ward-Close |
| 2015/0283614 A1 | 10/2015 | Wu |
| 2015/0306820 A1 | 10/2015 | Colin |
| 2015/0322557 A1 | 11/2015 | Etter |
| 2015/0336171 A1 | 11/2015 | Matejczyk |
| 2016/0215375 A1 | 7/2016 | Kawano |
| 2016/0332236 A1 | 11/2016 | Stoyanov |
| 2018/0044766 A1 * | 2/2018 | Tidesten .................. C22C 19/03 |

FOREIGN PATENT DOCUMENTS

| | | | |
|---|---|---|---|
| CN | 104690517 A | 6/2015 | |
| JP | 06256897 | 9/1994 | |
| JP | 2014105373 A5 | 1/2016 | |
| WO | WO-2016099390 A1 * | 6/2016 | ............ C22C 19/03 |
| WO | WO2016099390 A1 | 6/2016 | |

OTHER PUBLICATIONS

Nov. 22, 2018 International Search Report Transmitted.

* cited by examiner

*Primary Examiner* — Weiping Zhu
(74) *Attorney, Agent, or Firm* — Larry R. Meenan (57) ABSTRACT

In one aspect, methods of foil ling tooling articles from tool steel powder compositions via additive manufacturing techniques are described herein. A method of forming a tooling article comprises consolidating powder alloy into the tooling article via an additive manufacturing technique and heat treating the tooling article to provide the tooling article hardness of 35 to 65 HRC. The tooling article can be formed of an alloy composition comprising 0.2-2 weight percent carbon, 0-1 weight percent manganese, 0-1.5 weight percent silicon, 0-0.3 weight percent nickel, 0-15 weight percent cobalt, at least two of chromium, molybdenum, tungsten and vanadium in a combined amount of 5-25 weight percent and the balance iron. As described herein, the method can further comprise hot isostatic pressing the tooling article prior to the heating treatment.

33 Claims, 3 Drawing Sheets

FIG. 3 ns set forth herein.

TOOL STEEL ARTICLES FROM ADDITIVE MANUFACTURING

FIELD

The present invention relates articles produced by additive manufacturing techniques and, in particular, to methods of producing tool steel articles via additive manufacturing techniques.

BACKGROUND

Additive manufacturing (AM) generally encompasses processes in which digital 3-dimensional (3D) design data is employed to fabricate an article or component in layers by material deposition and processing. Various techniques have been developed falling under the umbrella of additive manufacturing. Additive manufacturing offers an efficient and cost-effective alternative to traditional article fabrication techniques based on molding processes. With additive manufacturing, the significant time and expense of mold and/or die construction and other tooling can be obviated. Further, additive manufacturing techniques make an efficient use of materials by permitting recycling in the process and precluding the requirement of mold lubricants and coolant. Most importantly, additive manufacturing enables significant freedom in article design. Articles having highly complex shapes can be produced without significant expense allowing the development and evaluation of a series of article designs prior to final design selection.

A wide variety of steels are employed in tooling applications. For example, wrought tool steels hardened and/or tempered to 50-70 HRC are common in tooling applications. However, the beneficial mechanical properties of wrought tool steels can be lost by other tooling fabrication techniques. Articles produced with tool steel powders by powder metallurgical techniques, for example, can exhibit dramatic reductions in hardness, tensile strength, toughness and elongation.

SUMMARY

In one aspect, methods of forming tooling articles from tool steel powder compositions via additive manufacturing techniques are described herein. In some embodiments, the tooling articles exhibit properties comparable to wrought tool steels, thereby overcoming disadvantages encountered with prior techniques employing powder alloy compositions. Briefly, a method of forming a tooling article comprises consolidating powder alloy into the tooling article via an additive manufacturing technique and heat treating the tooling article to provide the tooling article hardness of 35 to 65 HRC. The tooling article can be formed of an alloy composition comprising 0.2-2 weight percent carbon, 0-1 weight percent manganese, 0-1.5 weight percent silicon, 0-0.3 weight percent nickel, 0-15 weight percent cobalt, at least two of chromium, molybdenum, tungsten and vanadium in a combined amount of 5-25 weight percent and the balance iron. As described herein, the method can further comprise hot isostatic pressing the tooling article prior to the heating treatment.

In another aspect, tooling articles formed according to methods described herein are provided. In some embodiments, a tooling article is produced according to the process comprising consolidating powder alloy into the tooling article via an additive manufacturing technique and heat treating the tooling article to provide the tooling article hardness of 35 to 65 HRC.

These and other embodiments are described in greater detail in the following detailed description.

DETAILED DESCRIPTION

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

Methods of forming tooling articles from tool steel powder compositions via additive manufacturing techniques are described herein. A method, in some embodiments, comprises consolidating powder alloy into the tooling article via an additive manufacturing technique and heat treating the tooling article to provide the tooling article hardness of 35 to 65 HRC. The tooling article is formed of an alloy composition comprising 0.2-2 weight percent carbon, 0-1 weight percent manganese, 0-1.5 weight percent silicon, 0-0.3 weight percent nickel, 0-15 weight percent cobalt, at least two of chromium, molybdenum, tungsten and vanadium in a combined amount of 5-25 weight percent and the balance iron.

Turning now to specific steps, the powder alloy can be consolidated into the tooling article by several processes depending on the additive manufacturing technique employed. In some embodiments, for example, the powder alloy is consolidated into the tooling article via laser melting according to selective laser melting (SLM). In selective laser melting, an electronic file detailing the design parameters of the tooling article is provided. The laser melting apparatus spreads a layer of powder alloy in a build box. The build box can be under vacuum or inert atmosphere to avoid oxidation and/or other changes to the powder alloy. A laser beam melts and fuses selected regions of the powder alloy layer according to the design parameters of that layer. The build box is subsequently lowered, and a new layer of powder alloy is spread. The layer-by-layer melting and fusion process is repeated according to the electronic file until the tooling article is completed. In other embodiments, the powder alloy is consolidated into the tooling article via laser sintering according to a similar process. The tooling article consolidated via laser melting or laser sintering can be at least 95 percent theoretic density. In other embodiments, the tooling article can be at least 98 percent or at least 99 percent theoretical density.

Alternatively, the powder alloy can be consolidated by an organic binder and sintered to provide the tooling article. For example, binder jetting can provide a green tooling article formed of the powder alloy. In the binder jetting process, an electronic file detailing the design parameters of the green part is provided. The binder jetting apparatus spreads a layer of the powder alloy in a build box. A printhead moves over the powder layer depositing liquid binder according to design parameters for that layer. The layer is dried, and the build box is lowered. A new layer of powder alloy is spread, and the process is repeated until the green article is completed. Liquid binder can comprise any species not inconsistent with the objectives of the present invention. In some embodiment, liquid binder is organic binder and comprises one or more polymeric species. For example, liquid binder can comprise a polyvinylpyrrolidone (PVP)-polyethylene glycol (PEG) composition in polyglycol ether solvent. Other organic binders are also possible including polyethylene glycol monomethyl ether, polyvinyl alcohol, polyvinyl butyral and waxes.

The green article is subsequently sintered to provide the tooling article. Green tooling articles described herein can be sintered under conditions and for time periods to provide sintered articles having the desired density. In some embodiments, for example, green tooling articles are sintered to a density of at least 95 percent theoretical density. The green part can be vacuum sintered or sintered under a hydrogen or argon atmosphere at temperatures of 500° C. to 2000° C. In some embodiments, the sintering temperature is 1300° C. to 1560° C. Moreover, sintering times can range from 10 minutes to 20 hours. Temperatures can be ramped or stepped and held for various time periods prior to reaching peak sintering temperature. For example, in some embodiments, sintering temperature is stepped to 600-800° C. and then to 900-1100° C. prior to reaching peak sintering temperature of 1350-1450° C., the peak sintering temperature being below the melting point of the powder alloy composition. Hold times at each of the temperature steps can range from 1-5 hours, in some embodiments. The sintered tooling article, in some embodiments, can be at least 95 percent theoretic density. In other embodiments, the sintered tooling article can be at least 98 percent or at least 99 percent theoretical density. In further embodiments, the sintered tooling article can be fully dense.

Individual layers formed by the additive manufacturing technique during construction of the tooling article can generally range from 5 μm to 500 μm. In some embodiments, individual layers have thickness selected from Table I.

TABLE I

| AM Individual Layer Thickness (μm) |
| --- |
| 1-500 |
| 5-200 |
| 5-100 |
| 10-80 |
| 20-70 |
| 5-50 |

As described herein, the tooling article is formed of an alloy composition comprising 0.2-0.7 weight percent carbon, 0-1 weight percent manganese, 0-1.5 weight percent silicon, 0-0.3 weight percent nickel, 0-15 weight percent cobalt, at least two of chromium, molybdenum, tungsten an vanadium in a combined amount of 5-25 weight percent and the balance iron. Powder alloys enabling these compositional parameters in the tooling article can be employed in the additive manufacturing technique. In some embodiments, powder alloy consolidated into the tooling article by the additive manufacturing process has compositional parameters selected from Table II.

TABLE II

| Powder Alloy Compositions | | | | | | | | | |
| --- | --- | --- | --- | --- | --- | --- | --- | --- | --- |
| Powder Alloy | Fe bal. | C wt. % | Mn wt % | Si wt % | Cr wt. % | Ni wt. % | Mo wt. % | W wt. % | V wt. % | Co wt. % |
| 1 | Fe bal. | 0.35-0.45 | 0.25-0.7 | 0.8-1.2 | 3.0-3.75 | 0-0.3 | 2-3 | 0 | 0.25-0.75 | 0 |
| 2 | Fe bal. | 0.33-0.43 | 0.2-0.5 | 0.8-1.2 | 4.75-5.5 | 0-0.3 | 1.1-1.6 | 0 | 0.3-0.6 | 0 |
| 3 | Fe bal. | 0.3-0.4 | 0.2-0.5 | 0.8-1.2 | 4.75-5.5 | 0-0.3 | 1.25-1.75 | 1-1.7 | 0-0.5 | 0 |
| 4 | Fe bal. | 0.32-0.45 | 0.2-0.5 | 0.8-1.2 | 4.75-5.5 | 0-0.3 | 1.1-1.75 | 0 | 0.8-1.2 | 0 |
| 5 | Fe bal. | 0.35-0.45 | 0.2-0.5 | 0.8-1.2 | 4.75-5.5 | 0-0.3 | 0 | 4-5.25 | 0 | 0 |
| 6 | Fe bal. | 0.32-0.45 | 0.2-0.5 | 0.2-0.5 | 4-4.75 | 0-0.3 | 0.3-0.55 | 3.75-4.5 | 1.75-2.2 | 4-4.5 |
| 7 | Fe bal. | 0.23-0.36 | 0.15-0.4 | 0.15-0.5 | 3-3.75 | 0-0.3 | 0 | 8.5-10 | 0.3-0.6 | 0 |
| 8 | Fe bal. | 0.3-0.4 | 0.15-0.4 | 0.15-0.4 | 1.75-3.75 | 0.3 | 0 | 10-11.75 | 0.25-0.5 | 0 |
| 9 | Fe bal. | 0.25-0.35 | 0.15-0.4 | 0.15-0.6 | 11-12.75 | 0.3 | 0 | 11-12.75 | 0.75-1.25 | 0 |
| 10 | Fe bal. | 0.42-0.53 | 0.15-0.4 | 0.15-0.4 | 2.5-3.5 | 0-0.3 | 0 | 14-16 | 0.4-0.6 | 0 |
| 11 | Fe bal. | 0.22-0.32 | 0.15-0.4 | 0.15-0.4 | 3.75-4.5 | 0-0.3 | 0 | 14-16 | 0.4-0.6 | 0 |
| 12 | Fe bal. | 0.45-0.55 | 0.15-0.4 | 0.15-0.4 | 3.75-4.5 | 0-0.3 | 0 | 17.25-19 | 0.75-1.25 | 0 |
| 13 | Fe bal. | 0.5-0.6 | 0-0.5 | 0.75-1.10 | 4.75-5.5 | 0-0.3 | 1.15-1.65 | 1-1.5 | 0 | 0 |
| 14 | Fe bal. | 0.45-0.55 | 0-0.5 | 0.95-1.15 | 4.75-5.5 | 1.25-1.75 | 1.3-1.8 | 0 | 0.8-1.4 | 0 |
| 15 | Fe bal. | 0.3-0.5 | 0.1-1 | 0.5-1.5 | 2.5-6 | 0-0.3 | 0.2-3.5 | 0.5-5.5 | 0.2-2.5 | 0-5 |
| 16 | Fe bal. | 0.2-0.6 | 0.1-0.5 | 0.1-0.6 | 1.5-13 | 0-0.3 | 0 | 8-20 | 0.2-1.5 | 0 |
| 17 | Fe bal. | 0.7-1.5 | 0.1-1 | 0.1-1 | 3-5 | 0-0.3 | 3-12 | 1-11 | 0.8-3.5 | 0-13 |
| 18 | Fe bal. | 0.7-1.5 | 0.1-1 | 0.1-1 | 3-5 | 0-0.3 | 3-12 | 1-11 | 0.8-3.5 | 4.5-13 |
| 19 | Fe bal. | 0.75-0.9 | 0.1-0.5 | 0.2-0.5 | 3.25-4.25 | 0-0.3 | 8-9.5 | 1.2-2.2 | 0.9-1.4 | 0 |
| 20 | Fe bal. | 0.75-1.1 | 0.1-0.5 | 0.2-0.5 | 3.5-5 | 0-0.3 | 4.25-5.75 | 5.25-7 | 1.5-2.5 | 0 |
| 21 | Fe bal. | 0.9-1.2 | 0.1-0.5 | 0.2-0.5 | 3.5-5 | 0-0.3 | 4.5-7 | 5-7 | 2-3 | 0 |
| 22 | Fe bal. | 1-1.3 | 0.1-0.5 | 0.2-0.5 | 3.5-5 | 0-0.3 | 4.5-6.75 | 5-7 | 2.5-4 | 0 |
| 23 | Fe bal. | 1.2-1.45 | 0.1-0.5 | 0.2-0.5 | 3.5-5 | 0-0.3 | 4-5.75 | 5-6.75 | 3.5-5 | 0 |
| 24 | Fe bal. | 0.95-1.1 | 0.1-0.5 | 0.2-0.6 | 3.25-4.25 | 0-0.3 | 8-9.3 | 1.4-2.2 | 1.5-2.5 | 0 |
| 25 | Fe bal. | 0.8-1.1 | 0.1-0.5 | 0.2-0.5 | 3.5-5 | 0-0.3 | 7.5-9 | 0 | 1.6-2.4 | 0 |
| 26 | Fe bal. | 0.7-0.9 | 0.1-0.5 | 0.2-0.5 | 3.25-4.5 | 0-0.3 | 7.5-9.25 | 1.2-2.4 | 1-1.4 | 4.3-5.6 |
| 27 | Fe bal. | 0.8-0.95 | 0.1-0.5 | 0.1-0.5 | 3.25-4.25 | 0-0.3 | 8.75-10.25 | 1.1-2.2 | 1-1.4 | 7.5-9 |

TABLE II-continued

Powder Alloy Compositions

| Powder Alloy | Fe bal. | C wt. % | Mn wt % | Si wt % | Cr wt. % | Ni wt. % | Mo wt. % | W wt. % | V wt. % | Co wt. % |
|---|---|---|---|---|---|---|---|---|---|---|
| 28 | Fe bal. | 0.8-0.95 | 0.1-0.5 | 0.2-0.5 | 3.25-4.25 | 0-0.3 | 7.5-9.5 | 1.3-2.2 | 1.7-2.5 | 7.5-9 |
| 30 | Fe bal. | 0.8-0.9 | 0.1-0.5 | 0.2-0.5 | 3.5-4.75 | 0-0.3 | 4.3-5.7 | 5.3-6.9 | 1.6-2.3 | 4.3-5.6 |
| 31 | Fe bal. | 0.8-0.9 | 0.1-0.5 | 0.2-0.5 | 3.5-4.75 | 0-0.3 | 4.3-5.7 | 5.4-6.6 | 1.6-2.3 | 7.5-9 |
| 32 | Fe bal. | 1-1.2 | 0.2-0.6 | 0.1-0.5 | 3.5-4.75 | 0-0.3 | 3-4.5 | 6-7.2 | 1.7-2.3 | 4.5-6 |
| 33 | Fe bal. | 1-1.2 | 0.1-0.5 | 0.1-0.7 | 3.3-4.3 | 0-0.3 | 8.8-10.1 | 1.1-1.9 | 0.9-1.4 | 7.6-8.8 |
| 34 | Fe bal. | 1.1-1.3 | 0.2-0.5 | 0.1-0.7 | 3.3-4.3 | 0-0.3 | 7.3-8.6 | 2.2-3.1 | 1.4-1.8 | 7.6-8.8 |
| 35 | Fe bal. | 1-1.3 | 0.2-0.5 | 0.2-0.6 | 3.8-4.9 | 0-0.3 | 5.8-7.2 | 4.8-6 | 1.7-2.3 | 11-12.3 |
| 36 | Fe bal. | 1.2-1.35 | 0.2-0.5 | 0.3-0.7 | 3.5-4.5 | 0-0.3 | 7.8-8.8 | 1.8-2.3 | 2.8-3.5 | 7.5-9 |
| 37 | Fe bal. | 1-1.2 | 0.1-0.5 | 0.2-0.5 | 3.3-4.2 | 0-0.3 | 9-10.2 | 1.25-1.9 | 1.1-1.4 | 4.5-5.5 |
| 38 | Fe bal. | 1.4-1.55 | 0.1-0.5 | 0.1-0.5 | 3.3-4.2 | 0-0.3 | 4.7-5.6 | 9.3-10.7 | 2.6-3.3 | 7.8-10.2 |
| 39 | Fe bal. | 1.2-1.4 | 0.1-0.5 | 0.1-0.5 | 3.3-4.2 | 0-0.3 | 9.8-11.2 | 5.6-6.7 | 1.7-2.2 | 0 |
| 40 | Fe bal. | 0.6-1.7 | 0.1-1 | 0.1-1 | 3-5.5 | 0-0.3 | 0-1 | 10-20 | 0.5-6 | 0-15 |
| 41 | Fe bal. | 0.6-0.9 | 0.1-0.5 | 0.2-0.5 | 3.6-4.6 | 0-0.3 | 0 | 17-19 | 0.8-1.4 | 0 |
| 42 | Fe bal. | 0.7-1 | 0.2-0.5 | 0.2-0.5 | 3.6-4.6 | 0-0.3 | 0-1 | 17.3-19.2 | 1.7-2.5 | 0 |
| 43 | Fe bal. | 0.6-0.9 | 0.1-0.5 | 0.2-0.5 | 3.6-4.6 | 0-0.3 | 0.3-1 | 17.3-19.2 | 0.7-1.3 | 4.2-6 |
| 44 | Fe bal. | 0.7-0.9 | 0.1-0.5 | 0.2-0.5 | 3.6-5.1 | 0-0.3 | 0.4-1.3 | 17.3-19.2 | 1.7-2.5 | 6.8-9.7 |
| 45 | Fe bal. | 0.7-0.9 | 0.1-0.5 | 0.2-0.5 | 3.8-5 | 0-0.3 | 0.3-1.1 | 18.3-21.5 | 1.3-2.2 | 10.8-13.2 |
| 46 | Fe bal. | 0.7-0.9 | 0.2-0.5 | 0.2-0.5 | 3.6-4.6 | 0-0.3 | 0.3-1.1 | 13-15 | 1.7-2.3 | 4-6 |
| 47 | Fe bal. | 1.4-1.7 | 0.1-0.5 | 0.1-0.5 | 3.6-5.2 | 0-0.3 | 0-1 | 11.5-13.2 | 4.3-5.3 | 4.5-5.5 |
| 48 | Fe bal. | 0.7-0.9 | 0.1-0.5 | 0.2-0.7 | 3.6-4.6 | 0-0.3 | 3.8-4.8 | 0 | 0.7-1.3 | 0 |
| 49 | Fe bal. | 0.8-1 | 0.1-0.5 | 0.2-0.7 | 3.3-4.5 | 0-3 | 3.8-5 | 0.7-1.7 | 1.6-2.3 | 0 |

Powder alloy used in the additive manufacturing technique can have any particle size not inconsistent with the objectives of the present invention. In some embodiments, powder alloy has an average particle size of 10-200 μm. In other embodiments, the powder alloy can have average particles size of 15-150 μm. The powder alloy can also have average particle size less than 10 μm or less than 1 μm, in further embodiments. For certain AM techniques, including binder jetting, the powder alloy may have average particle size of 50 nm to less than 1 μm.

Subsequent to formation by the additive manufacturing technique or process, the tooling article is heat treated to provide the tooling article hardness of at least 35 HRC. Hardness values recited herein are determined according to ASTM E-18-02 Standard Test Method for Rockwell Hardness of Metallic Materials. In some embodiments, hardness of the tooling article after heat treatment has a value selected from Table III.

TABLE III

| Hardness of Heat Treated Tooling Article (HRC) |
|---|
| 40-50 |
| 40-60 |
| 45-55 |
| 50-60 |
| 50-57 |

Heat treating the tooling article, in some embodiments, comprises the steps of annealing, hardening and at least one tempering cycle. In some embodiments, two or three tempering cycles can be part of heat treating the tooling article. Temperatures and times of various steps of the heat treatment can be selected according to several considerations including but not limited to the tool steel alloy composition, the intended use and operating environment of the tooling article as well as size and/or dimensions of the tooling article. In some embodiments, peak annealing temperature is in the range of 540° C. to 900° C. For example, peak annealing temperature can range from 815° C. to 900° C., in some embodiments. Annealing times can generally range from 1 to 15 hours, wherein the tooling article experiences peak annealing temperatures for a time period of 0.5-3 hours. After holding at peak temperature, the tooling article can be cooled at any desired rate. In some embodiments, the tooling article is cooled to 600-700° C. for 1-2 hours and slow cooled to 500° C. for stress relieving prior to the hardening step of the heat treatment. Annealing temperatures, times and cooling rates can be dependent on several considerations including, but not limited to, alloy composition of the tooling article and dimensions of the tooling article.

Subsequent to annealing, the tooling article can be hardened. Hardening can generally include one or more preheating steps. In some embodiments, the tooling article is heated to 450-570° C. and then to 800-900° C. After the preheating steps, the tooling article experiences peak hardening temperature of 1000-1300° C. followed by quenching. In some embodiments, peak hardening temperature occurs in a range selected from Table IV.

TABLE IV

| Peak Hardening Temperature (° C.) |
|---|
| 980-1210 |
| 1090-1300 |
| 1175-1300 |
| 1000-1050 |
| 1000-1020 |

Quenching can occur in neutral salt baths, in some embodiments. Total time for hardening can be 1-4 hours with exposure to peak temperature for a time period of 0.5-2 hours. Following hardening, the tooling article can undergo at least one tempering cycle. Tempering cycles are conducted at 400-820° C. for individual time periods of 1-3 hours. In some embodiments, one or more tempering cycles are conducted at temperatures selected from Table V.

TABLE V

| Tempering Temperatures (° C.) |
| --- |
| 500-820 |
| 500-715 |
| 400-650 |
| 520-620 |

In some embodiments, the annealing step is skipped and the heat treatment comprises hardening and at least one annealing cycle.

As described herein, the tooling article can be subjected to hot isostatic pressing (HIP) prior to heat treating. Hot isostatic pressing can be administered under inert atmosphere for up to 4 hours at pressures of 3 MPa to 250 MPa and temperatures of 1150° C. to 1400° C. In some embodiments, for example, pressures of 50 to 150 MPa and temperatures of 1150° C. to 1220° C. are employed in hot isostatic pressing of the tooling article. Peak hot isostatic pressing temperatures are generally less than the melting point of the alloy composition. Temperature, time and pressure of hot isostatic pressing can be selected according to several considerations including, but not limited to, tool steel alloy composition, porosity of the tooling article prior to pressing and desired porosity of the tool article post hot isostatic pressing. In some embodiments, hot isostatic pressing conditions are administered to render the tooling article at least 98 percent theoretical density prior to heat treating. Hot isostatic pressing conditions can be set to ensure to the tooling article is at least 99 percent theoretical density prior to heat treating. In some embodiments, the tooling article is fully dense subsequent to hot isostatic pressing. Tooling articles formed by selective laser melting, selective laser sintering and/or binder jetting and sintering can be subjected to hot isostatic pressing prior to heat treating.

In some embodiments, hot isostatic pressing can be combined with hardening in a single step. The tooling article, for example, can be hot isostatic pressed under conditions described herein. Subsequent to completion of hot isostatic pressing, the hardening cycle begins without cooling the tooling article to room temperature or slightly above room temperature. In some embodiments, for example, temperatures are cooled 850-900° C. subsequent to hot isostatic pressing to begin hardening. After cooling to 850-900° C., the tooling article experiences peak hardening temperature of 1000-1020° C. followed by quenching. Alternatively, hot isostatic pressing temperature can be extended into the hardening cycle followed by a brief hold at 1000-1020° C. and then quenching. One or more tempering cycles can follow the combined hot isostatic pressing and hardening.

In addition to high hardness, heat treating can enhance tensile strength and fracture toughness of the tooling article. The heat treated tooling article can have tensile strength of at least 1200 MPa. Tensile strength values recited herein are determined according to ASTM E8-15a—Standard Test Methods for Tension Testing of Metallic Materials. In some embodiments, the heat treated tooling article has tensile strength selected from Table VI.

TABLE VI

| Tensile Strength of Heat Treated Tooling Article (MPa) |
| --- |
| 1200-2200 |
| 1500-2200 |
| 1700-2100 |
| 1800-2000 |
| 1850-2200 |
| 1900-2200 |
| 2000-2200 |

A heat treated tooling article can also exhibit fracture toughness of at least 2 J. Fracture toughness values recited herein are determined according ASTM E23-16b Standard Test Method for Notched Bar Impact testing of Metallic Materials. In some embodiments, the heat treated tooling article has tensile strength selected from Table VII.

TABLE VII

| Fracture Toughness of Heat Treated Tooling Article (J) |
| --- |
| 2-25 |
| 2-15 |
| 2-10 |
| 3-8 |
| 4-10 |
| 7-12 |
| 8-15 |
| 10-25 |

As described herein, the heat treated tooling article is formed of an alloy composition comprising 0.2-0.7 weight percent carbon, 0-1 weight percent manganese, 0-1.5 weight percent silicon, 0-0.3 weight percent nickel, 0-5 weight percent cobalt, at least two of chromium, molybdenum, tungsten an vanadium in a combined amount of 5-25 weight percent and the balance iron. In some embodiments, the heat treated tooling article is formed of an alloy composition comprising 0.3-0.5 weight percent carbon, 0.1-1 weight percent manganese, 0.5-1.5 weight percent silicon, 2.5-6 weight percent chromium, 0-0.3 weight percent nickel, 0.2-3.5 weight percent molybdenum, 0.5-5.5 weight percent tungsten and 0.2-2.5 weight percent vanadium and the balance iron. In other embodiments, a heat treated tooling article is formed of an alloy composition comprising 0.2-0.6 weight percent carbon, 0.1-0.5 weight percent manganese, 0.1-0.6 weight percent silicon, 1.5-13 weight percent chromium, 0-0.3 weight percent nickel, 8-20 weight percent tungsten, 0.2-1.5 weight percent vanadium and the balance iron. In some embodiments, a heat treated tooling article is formed of an alloy composition comprising 0.7-1.5 weight percent carbon, 0.1-1 weight percent manganese, 0.1-1 weight percent silicon, 3-5 weight percent chromium, 0-0.3 weight percent nickel, 3-12 weight percent molybdenum, 1-11 weight percent tungsten, 0.8-3.5 weight percent vanadium, 0-13 weight percent cobalt and the balance iron. Moreover, a heated treated tooling article can be formed of an alloy composition comprising 0.6-1.5 weight percent carbon, 0.1-1 weight percent manganese, 0.1-1 weight percent silicon, 3-5.5 weight percent chromium, 0-0.3 weight percent nickel, 0-1.5 weight percent molybdenum, 10-20 weight percent tungsten, 0.5-6 weight percent vanadium, 0-15 weight percent cobalt and the balance iron. In additional embodiments, heat treated tooling articles may be formed of an alloy composition selected from Table VIII.

TABLE VIII

Alloy Compositions of Heat Treated Tooling Article

| Alloy Comp | Fe bal. | C wt. % | Mn wt % | Si wt % | Cr wt. % | Ni wt. % | Mo wt. % | W wt. % | V wt. % | Co wt. % |
|---|---|---|---|---|---|---|---|---|---|---|
| 1 | Fe bal. | 0.35-0.45 | 0.25-0.7 | 0.8-1.2 | 3.0-3.75 | 0-0.3 | 2-3 | 0 | 0.25-0.75 | 0 |
| 2 | Fe bal. | 0.33-0.43 | 0.2-0.5 | 0.8-1.2 | 4.75-5.5 | 0-0.3 | 1.1-1.6 | 0 | 0.3-0.6 | 0 |
| 3 | Fe bal. | 0.3-0.4 | 0.2-0.5 | 0.8-1.2 | 4.75-5.5 | 0-0.3 | 1.25-1.75 | 1-1.7 | 0-0.5 | 0 |
| 4 | Fe bal. | 0.32-0.45 | 0.2-0.5 | 0.8-1.2 | 4.75-5.5 | 0-0.3 | 1.1-1.75 | 0 | 0.8-1.2 | 0 |
| 5 | Fe bal. | 0.35-0.45 | 0.2-0.5 | 0.8-1.2 | 4.75-5.5 | 0-0.3 | 0 | 4-5.25 | 0 | 0 |
| 6 | Fe bal. | 0.32-0.45 | 0.2-0.5 | 0.2-0.5 | 4-4.75 | 0-0.3 | 0.3-0.55 | 3.75-4.5 | 1.75-2.2 | 4-4.5 |
| 7 | Fe bal. | 0.23-0.36 | 0.15-0.4 | 0.15-0.5 | 3-3.75 | 0-0.3 | 0 | 8.5-10 | 0.3-0.6 | 0 |
| 8 | Fe bal. | 0.3-0.4 | 0.15-0.4 | 0.15-0.4 | 1.75-3.75 | 0.3 | 0 | 10-11.75 | 0.25-0.5 | 0 |
| 9 | Fe bal. | 0.25-0.35 | 0.15-0.4 | 0.15-0.6 | 11-12.75 | 0.3 | 0 | 11-12.75 | 0.75-1.25 | 0 |
| 10 | Fe bal. | 0.42-0.53 | 0.15-0.4 | 0.15-0.4 | 2.5-3.5 | 0-0.3 | 0 | 14-16 | 0.4-0.6 | 0 |
| 11 | Fe bal. | 0.22-0.32 | 0.15-0.4 | 0.15-0.4 | 3.75-4.5 | 0-0.3 | 0 | 14-16 | 0.4-0.6 | 0 |
| 12 | Fe bal. | 0.45-0.55 | 0.15-0.4 | 0.15-0.4 | 3.75-4.5 | 0-0.3 | 0 | 17.25-19 | 0.75-1.25 | 0 |
| 13 | Fe bal. | 0.5-0.6 | 0-0.5 | 0.75-1.10 | 4.75-5.5 | 0-0.3 | 1.15-1.65 | 1-1.5 | 0 | 0 |
| 14 | Fe bal. | 0.45-0.55 | 0-0.5 | 0.95-1.15 | 4.75-5.5 | 1.25-1.75 | 1.3-1.8 | 0 | 0.8-1.4 | 0 |
| 15 | Fe bal. | 0.3-0.5 | 0.1-1 | 0.5-1.5 | 2.5-6 | 0-0.3 | 0.2-3.5 | 0.5-5.5 | 0.2-2.5 | 0-5 |
| 16 | Fe bal. | 0.2-0.6 | 0.1-0.5 | 0.1-0.6 | 1.5-13 | 0-0.3 | 0 | 8-20 | 0.2-1.5 | 0 |
| 17 | Fe bal. | 0.7-1.5 | 0.1-1 | 0.1-1 | 3-5 | 0-0.3 | 3-12 | 1-11 | 0.8-3.5 | 0-13 |
| 18 | Fe bal. | 0.7-1.5 | 0.1-1 | 0.1-1 | 3-5 | 0-0.3 | 3-12 | 1-11 | 0.8-3.5 | 4.5-13 |
| 19 | Fe bal. | 0.75-0.9 | 0.1-0.5 | 0.2-0.5 | 3.25-4.25 | 0-0.3 | 8-9.5 | 1.2-2.2 | 0.9-1.4 | 0 |
| 20 | Fe bal. | 0.75-1.1 | 0.1-0.5 | 0.2-0.5 | 3.5-5 | 0-0.3 | 4.25-5.75 | 5.25-7 | 1.5-2.5 | 0 |
| 21 | Fe bal. | 0.9-1.2 | 0.1-0.5 | 0.2-0.5 | 3.5-5 | 0-0.3 | 4.5-7 | 5-7 | 2-3 | 0 |
| 22 | Fe bal. | 1-1.3 | 0.1-0.5 | 0.2-0.5 | 3.5-5 | 0-0.3 | 4.5-6.75 | 5-7 | 2.5-4 | 0 |
| 23 | Fe bal. | 1.2-1.45 | 0.1-0.5 | 0.2-0.5 | 3.5-5 | 0-0.3 | 4-5.75 | 5-6.75 | 3.5-5 | 0 |
| 24 | Fe bal. | 0.95-1.1 | 0.1-0.5 | 0.2-0.6 | 3.25-4.25 | 0-0.3 | 8-9.3 | 1.4-2.2 | 1.5-2.5 | 0 |
| 25 | Fe bal. | 0.8-1.1 | 0.1-0.5 | 0.2-0.5 | 3.5-5 | 0-0.3 | 7.5-9 | 0 | 1.6-2.4 | 0 |
| 26 | Fe bal. | 0.7-0.9 | 0.1-0.5 | 0.2-0.5 | 3.25-4.5 | 0-0.3 | 7.5-9.25 | 1.2-2.4 | 1-1.4 | 4.3-5.6 |
| 27 | Fe bal. | 0.8-0.95 | 0.1-0.5 | 0.1-0.5 | 3.25-4.25 | 0-0.3 | 8.75-10.25 | 1.1-2.2 | 1-1.4 | 7.5-9 |
| 28 | Fe bal. | 0.8-0.95 | 0.1-0.5 | 0.2-0.5 | 3.25-4.25 | 0-0.3 | 7.5-9.5 | 1.3-2.2 | 1.7-2.5 | 7.5-9 |
| 30 | Fe bal. | 0.8-0.9 | 0.1-0.5 | 0.2-0.5 | 3.5-4.75 | 0-0.3 | 4.3-5.7 | 5.3-6.9 | 1.6-2.3 | 4.3-5.6 |
| 31 | Fe bal. | 0.8-0.9 | 0.1-0.5 | 0.2-0.5 | 3.5-4.75 | 0-0.3 | 4.3-5.7 | 5.4-6.6 | 1.6-2.3 | 7.5-9 |
| 32 | Fe bal. | 1-1.2 | 0.2-0.6 | 0.1-0.5 | 3.5-4.75 | 0-0.3 | 3-4.5 | 6-7.2 | 1.7-2.3 | 4.5-6 |
| 33 | Fe bal. | 1-1.2 | 0.1-0.5 | 0.1-0.7 | 3.3-4.3 | 0-0.3 | 8.8-10.1 | 1.1-1.9 | 0.9-1.4 | 7.6-8.8 |
| 34 | Fe bal. | 1.1-1.3 | 0.2-0.5 | 0.1-0.7 | 3.3-4.3 | 0-0.3 | 7.3-8.6 | 2.2-3.1 | 1.4-1.8 | 7.6-8.8 |
| 35 | Fe bal. | 1-1.3 | 0.2-0.5 | 0.2-0.6 | 3.8-4.9 | 0-0.3 | 5.8-7.2 | 4.8-6 | 1.7-2.3 | 11-12.3 |
| 36 | Fe bal. | 1.2-1.35 | 0.2-0.5 | 0.3-0.7 | 3.5-4.5 | 0-0.3 | 7.8-8.8 | 1.8-2.3 | 2.8-3.5 | 7.5-9 |
| 37 | Fe bal. | 1-1.2 | 0.1-0.5 | 0.2-0.5 | 3.3-4.2 | 0-0.3 | 9-10.2 | 1.25-1.9 | 1.1-1.4 | 4.5-5.5 |
| 38 | Fe bal. | 1.4-1.55 | 0.1-0.5 | 0.1-0.5 | 3.3-4.2 | 0-0.3 | 4.7-5.6 | 9.3-10.7 | 2.6-3.3 | 7.8-10.2 |
| 39 | Fe bal. | 1.2-1.4 | 0.1-0.5 | 0.1-0.5 | 3.3-4.2 | 0-0.3 | 9.8-11.2 | 5.6-6.7 | 1.7-2.2 | 0 |
| 40 | Fe bal. | 0.6-1.7 | 0.1-1 | 0.1-1 | 3-5.5 | 0-0.3 | 0-1.5 | 10-20 | 0.5-6 | 0-15 |
| 41 | Fe bal. | 0.6-0.9 | 0.1-0.5 | 0.2-0.5 | 3.6-4.6 | 0-0.3 | 0 | 17-19 | 0.8-1.4 | 0 |
| 42 | Fe bal. | 0.7-1 | 0.2-0.5 | 0.2-0.5 | 3.6-4.6 | 0-0.3 | 0-1 | 17.3-19.2 | 1.7-2.5 | 0 |
| 43 | Fe bal. | 0.6-0.9 | 0.1-0.5 | 0.2-0.5 | 3.6-4.6 | 0-0.3 | 0.3-1 | 17.3-19.2 | 0.7-1.3 | 4.2-6 |
| 44 | Fe bal. | 0.7-0.9 | 0.1-0.5 | 0.2-0.5 | 3.6-5.1 | 0-0.3 | 0.4-1.3 | 17.3-19.2 | 1.7-2.5 | 6.8-9.7 |
| 45 | Fe bal. | 0.7-0.9 | 0.1-0.5 | 0.2-0.5 | 3.8-5 | 0-0.3 | 0.3-1.1 | 18.3-21.5 | 1.3-2.2 | 10.8-13.2 |
| 46 | Fe bal. | 0.7-0.9 | 0.2-0.5 | 0.2-0.5 | 3.6-4.6 | 0-0.3 | 0.3-1.1 | 13-15 | 1.7-2.3 | 4-6 |
| 47 | Fe bal. | 1.4-1.7 | 0.1-0.5 | 0.1-0.5 | 3.6-5.2 | 0-0.3 | 0-1 | 11.5-13.2 | 4.3-5.3 | 4.5-5.5 |
| 48 | Fe bal. | 0.7-0.9 | 0.1-0.5 | 0.2-0.7 | 3.6-4.6 | 0-0.3 | 3.8-4.8 | 0 | 0.7-1.3 | 0 |
| 49 | Fe bal. | 0.8-1 | 0.1-0.5 | 0.2-0.7 | 3.3-4.5 | 0-3 | 3.8-5 | 0.7-1.7 | 1.6-2.3 | 0 |

Figure 1:
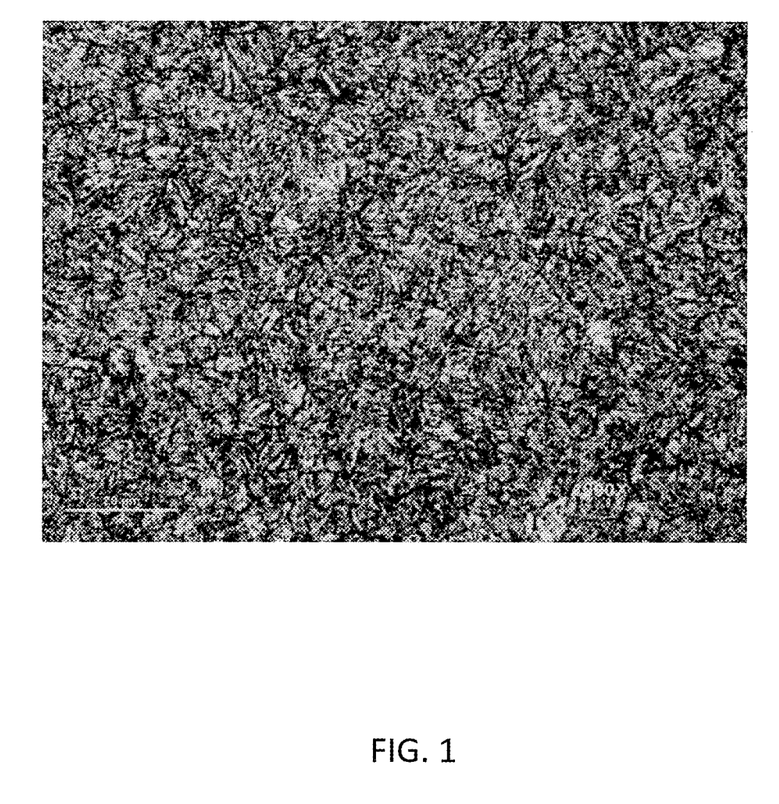
FIG. 1 is an optical micrograph illustrating microstructure of wrought H13 tool steel that has been heat treated according to industrial techniques.

FIG. 1 is an optical micrograph illustrating microstructure of wrought H13 tool steel that has been heat treated according to industrial techniques. The wrought H13 tool steel of FIG. 1 exhibited the properties listed in Table IX.

TABLE IX

H13 Tool Steel Properties

| Forming Direction | Forming Operation | Hardness (HRC) | Strength (MPa) | Elongation (%) | Toughness (J) |
|---|---|---|---|---|---|
| Parallel | Wrought | 52 | 1882 | 10 | 7 |
| Perpendicular | SLM | 52 | 1956 | 6 | 3 |
| Parallel | Binder Jetting | 54 | 1968 | 4 | 9 |

Figure 2:
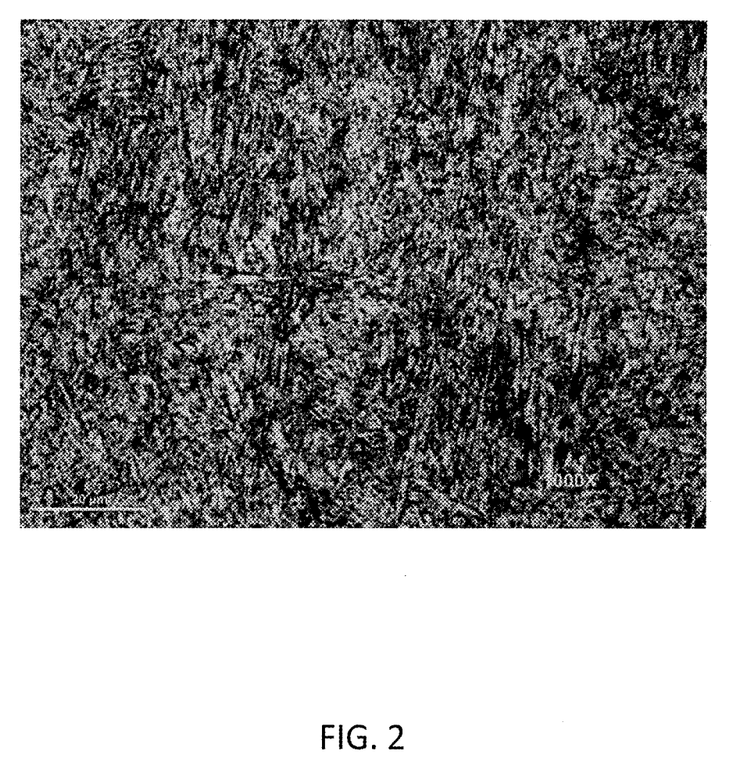
FIG. 2 is an optical micrograph illustrating the microstructure of an H13 tool steel article formed by SLM followed by hot isostatic pressing and heat treatment according to parameters set forth herein.
Figure 3:
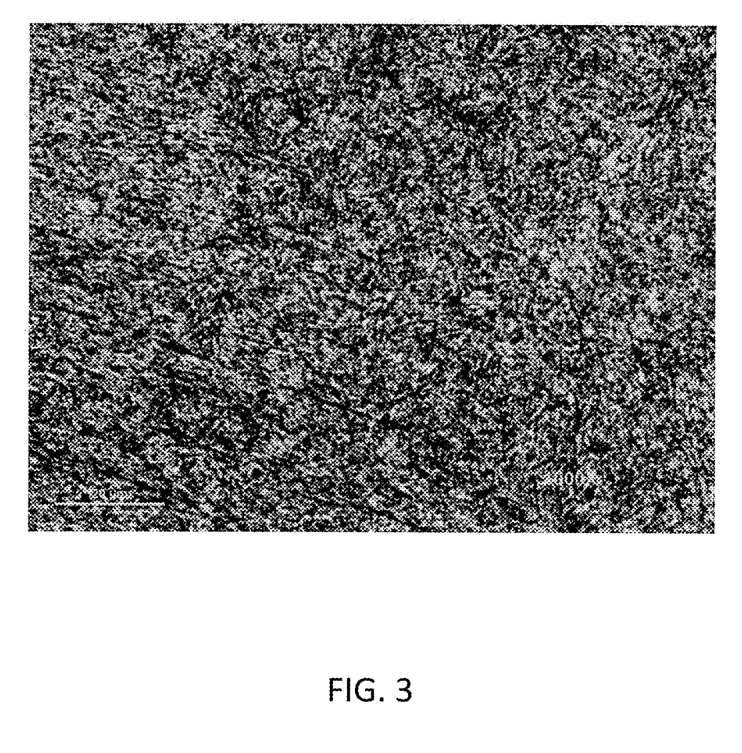
FIG. 3 is an optical micrograph illustrating the microstructure of an H13 tool steel article formed by binder jetting followed by hot isostatic pressing and heat treatment according to parameters set forth herein.

Articles were also formed of the same H13 tool steel composition using the AM techniques of SLM and binder jetting according to the methods described herein. FIG. 2 is an optical micrograph illustrating the microstructure of an H13 tool steel article formed by SLM followed by hot isostatic pressing and heat treatment according to parameters set forth herein. The SLM-HIP-heat treated H13 tool steel exhibited the properties listed in Table IX. Moreover, FIG. 3 is an optical micrograph illustrating the microstructure of an H13 tool steel article formed by binder jetting followed by hot isostatic pressing and heat treatment according to parameters set forth herein. The binder jet-HIP-heat treated H13 tool steel exhibited the properties listed in Table IX. As provided in Table IX, the H13 tool steel articles formed by SLM and binder jetting followed by HIP and heat treatment have properties comparable to or exceeding wrought H13 tool steel.

Accordingly, various tooling articles of complex shape and/or structure can be formed from tool steel compositions disclosed herein without significant losses in mechanical properties. Tooling articles made according to methods described herein can find application in any desired field. Moreover, the additive manufacturing processes employed in the present methods can enable tooling structures and architectures not possible with current tooling fabrication techniques. Tooling articles described herein, for example, can be rotary tooling apparatus including drills, drill bodies, hydraulic chucks, reducer sleeves for hydraulic chucks, reamer heads, reamer shanks, milling cutters, collets, expansion sleeves, adapters and shrink fit extensions, cutting tools, clamps, boring bars and tool holders.

In another aspect, tooling articles formed according to methods described herein are provided. In some embodiments, a tooling article is produced according to the process comprising consolidating powder alloy into the tooling article via an additive manufacturing technique and heat treating the tooling article to provide the tooling article hardness of 35 to 65 HRC. Heat treating the tooling article, in some embodiments, comprises the steps of annealing, hardening and at least one tempering cycle, as described above. In some embodiments, two or three tempering cycles can be part of heat treating the tooling article. Temperatures and times of various steps of the heat treatment can be selected according to several considerations including but not limited to the tool steel alloy composition, the intended use and operating environment of the tooling article as well as size and/or dimensions of the tooling article. A tooling article produced according to methods described herein can have any compositional, microstructural and/or mechanical properties described above. Moreover, processes employed to form the tooling articles can include any combination of process steps described herein.

The invention claimed is:

1. A method of forming a tooling article comprising:
   consolidating powder alloy into the tooling article via an additive manufacturing technique comprising sintering or melting; and
   heat treating the tooling article to provide the tooling article hardness of 35 to 65 HRC and a tensile strength of 1200-2200 MPa, wherein the tooling article is formed of an alloy composition comprising 0.2-2 weight percent carbon, 0-1 weight percent manganese, 0-1.5 weight percent silicon, 0-0.3 weight percent nickel, 0-15 weight percent cobalt, at least two of chromium, molybdenum, tungsten and vanadium in a combined amount of 5-25 weight percent and the balance iron.

2. The method of claim 1, wherein the alloy composition comprises 0.3-0.5 weight percent carbon, 0.1-1 weight percent manganese, 0.5-1.5 weight percent silicon, 2.5-6 weight percent chromium, 0-0.3 weight percent nickel, 0.2-3.5 weight percent molybdenum, 0.5-5.5 weight percent tungsten and 0.2-2.5 weight percent vanadium and the balance iron.

3. The method of claim 1, wherein the alloy composition comprises 0.2-0.6 weight percent carbon, 0.1-0.5 weight percent manganese, 0.1-0.6 weight percent silicon, 1.5-13 weight percent chromium, 0-0.3 weight percent nickel, 8-20 weight percent tungsten, 0.2-1.5 weight percent vanadium and the balance iron.

4. The method of claim 1, wherein the alloy composition comprises 0.7-1.5 weight percent carbon, 0.1-1 weight percent manganese, 0.1-1 weight percent silicon, 3-5 weight percent chromium, 0-0.3 weight percent nickel, 3-12 weight percent molybdenum, 1-11 weight percent tungsten, 0.8-3.5 weight percent vanadium, 0-13 weight percent cobalt and the balance iron.

5. The method of claim 1, wherein the alloy composition comprises 0.6-1.5 weight percent carbon, 0.1-1 weight percent manganese, 0.1-1 weight percent silicon, 3-5.5 weight percent chromium, 0-0.3 weight percent nickel, 0-1.5 weight percent molybdenum, 10-20 weight percent tungsten, 0.5-6 weight percent vanadium, 0-15 weight percent cobalt and the balance iron.

6. The method of claim 1, wherein the tooling article exhibits elongation of at least 2% subsequent to the heat treating.

7. The method of claim 1, wherein the tooling article exhibits elongation of 3-20% subsequent to the heat treating.

8. The method of claim 1, wherein the tooling article exhibits fracture toughness of at least 2 J subsequent to heat treating.

9. The method of claim 1, wherein the tooling article exhibits fracture toughness of 5-25 J subsequent to heat treating.

10. The method of claim 1, wherein the tooling article exhibits tensile strength of 1900-2000 MPa.

11. The method of claim 10, wherein the tooling article has hardness of 50-60 HRC.

12. The method of claim 1 further comprising hot isostatic pressing the tooling article prior to heating treating.

13. The method of claim 12, wherein the tooling article is at least 95 percent theoretical density prior to hot isostatic pressing.

14. The method of claim 12, wherein the tooling article has hardness of 50-65 HRC.

15. The method of claim 12, the heat treating consists essentially of hardening and at least one tempering cycle.

16. The method of claim 15, wherein the hot isostatic pressing and hardening are combined into a single step.

17. The method of claim 1, wherein the tooling article is at least 98 percent theoretical density prior to the heat treating.

18. The method of claim 1, wherein layers provided by the additive manufacturing technique during formation of the tooling article have individual thickness of 5 μm to 500 μm.

19. The method of claim 1, wherein the powder alloy is consolidated into the tooling article via laser sintering of the powder alloy.

20. The method of claim 1, wherein the powder alloy is consolidated into the tooling article via laser melting of the powder alloy.

21. The method of claim 1, wherein powder alloy is consolidated via an organic binder and sintered to provide the tooling article.

22. The method of claim 21, wherein the tooling article has hardness of 50-60 HRC and tensile strength of 1800-2200 MPa.

23. The method of claim 1, wherein heat treating comprises annealing, hardening and at least one tempering cycle.

24. The method of claim 23, wherein peak temperature of the annealing is 850° C. to 900° C.

25. The method of claim 23, wherein hardening occurs at a peak temperature of 1000° C. to 1020° C. followed by quenching.

26. The method of claim 25, wherein the at least one tempering cycle occurs at a temperature of 530° C. to 570° C.

27. The method of claim 1, wherein the heat treating consists essentially of hardening and at least one tempering cycle.

28. The method of claim 1, wherein heat treating comprises the steps of annealing, hardening, and a plurality of tempering cycles.

29. The method of claim 28, wherein the hardening comprises two preheating steps prior to peak hardening temperature, the preheating steps having temperatures of 450-570° C. and 800-900° C.

30. The method of claim 28 further comprising quenching the tooling article in neutral salt bath subsequent to reaching peak hardening temperature.

31. The method of claim 28, wherein the tooling article is exposed to peak hardening temperature for a time period of 0.5-3 hours.

32. The method of claim 31, wherein the tooling article is exposed to peak annealing temperature for a time period of 0.5-2 hours.

33. The method of claim 1, wherein the powder alloy has an average particle size of 15-150 µm.

\* \* \* \* \*